United States Patent
Case et al.

(10) Patent No.: US 6,543,222 B1
(45) Date of Patent: Apr. 8, 2003

(54) BRAKING SYSTEM FOR BRAKING A ROTOR RELATIVE TO A STATOR

(75) Inventors: Jean-Claude Case, Bonneuil en Valois (FR); Jean-Pierre Souply, Senlis (FR); Jean-Marie Rouillard, La Croix Saint Ouen (FR); Stéphane Vidal, Longueil Sainte Marie (FR)

(73) Assignee: Poclain Hydraulics Industrie, Verberie (FR)

( * ) Notice: Subject to any disclaimer, the term of this patent is extended or adjusted under 35 U.S.C. 154(b) by 169 days.

(21) Appl. No.: 09/624,823

(22) Filed: Jul. 25, 2000

(65) Prior Publication Data

(65)

(30) Foreign Application Priority Data

Jul. 27, 1999 (FR) ............................................ 99 09718

(51) Int. Cl.⁷ .............................................. F16D 31/02
(52) U.S. Cl. ......................... 60/436; 92/20; 188/264 F
(58) Field of Search ........................ 60/442, 436; 92/20; 188/264 R, 264 D, 264 F

(56) References Cited

U.S. PATENT DOCUMENTS 5,911,292 A  6/1999 Schade et al. ........... 192/70.12

FOREIGN PATENT DOCUMENTS

EP  0913304  5/1999

Primary Examiner—Edward K. Look
Assistant Examiner—Michael Leslie
(74) Attorney, Agent, or Firm—Ladas & Parry

(57) ABSTRACT

A braking system (S) for braking a rotor (5, 9, 106) relative to a stator (1C, 1'C), said system comprising two series of brake disks (102, 104) secured respectively to the stator and to the rotor and disposed in a disk enclosure (100). The system further comprises a brake piston device (108, 114, 116) urged continuously in the braking direction by resilient return means (118). The piston device is urged in the brake release direction by feeding a brake release chamber (120) with fluid, and it is urged in the braking direction by feeding a braking chamber (124) with fluid. The braking system includes a cooling device for cooling the brake disks (102, 104) by means of fluid flow, which device is provided with a cooling duct (140) branching from the brake release duct (122) which feeds the brake release chamber (120) and communicating with the disk enclosure (100). It is provided with means (148) for limiting the quantity of cooling fluid tapped by the cooling duct (140) from the brake release duct (122).

20 Claims, 5 Drawing Sheets

BRAKING SYSTEM FOR BRAKING A ROTOR RELATIVE TO A STATOR

The present invention relates to a braking system for braking a rotor relative to a stator, said system comprising brake disks disposed in a disk enclosure, which disks are distributed in a first series of disks secured to the stator and in a second series of disks constrained to rotate with the rotor relative to the stator, the system further comprising a brake piston device that can be caused to go between a braking configuration in which an active portion of said piston device co-operates with the brake disks so as to urge said disks into braking contact, and a brake release configuration, the system further comprising control means for controlling the piston device, which control means comprise braking resilient return means continuously urging the brake piston device towards its braking configuration, a brake release chamber distinct from the disk enclosure and suitable for being fed with pressurized fluid via a brake release duct so as to urge the brake piston device into its brake release configuration, and a braking chamber suitable for being fed with pressurized fluid so as to urge the brake piston device towards its braking configuration, the braking system further comprising a cooling device for cooling the brake disks by means of fluid flow.

Such a braking system is a multi-effect braking system. It makes it possible to provide parking and emergency braking by means of the presence of the braking resilient return means which make braking possible when the brake release chamber is not fed with pressurized fluid to an extent sufficient to increase in volume by overcoming the braking resilient return force. It also makes it possible to provide in-service or dynamic braking which serves to decelerate and to brake a vehicle driven by a motor including the braking system, under the effect of fluid being fed to the braking chamber. Thus, the brake disks are suitable for absorbing the energy produced on decelerating and stopping the vehicle.

It is known, e.g. from patents US 3 927 737 and US 3 946 837, that it is necessary to irrigate the brake disks of such a multi-effect brake with a cooling fluid. The cooling is achieved by a flow of fluid fed via a specific cooling duct that opens out in the disk enclosure. The flow of cooling fluid is removed to the outside of the casing of the braking system via another duct connected to a fluid return.

Thus, the casing of the braking system must be provided with two orifices for the cooling fluid circuit, an orifice for the brake release duct that feeds the brake release chamber, and an orifice for the braking duct that feeds the braking chamber. Four holes, each of which is connected to a specific fluid duct, are necessary since each of them needs special treatment. This increases production costs and complicates management of the braking system.

A braking system of the above-mentioned type is also known from EP-A-0 913 304, in which a tapping duct continuously connects the brake release chamber to the disk enclosure. The tapping duct is formed in a valve device which serves to facilitate emptying the brake release chamber when emergency in-service braking is necessary. The fluid tapped continuously from the brake release chamber serves to lubricate and to cool the brake disk assembly.

The tapping duct is disposed inside the braking system, between the brake release chamber and the assembly of disks. It can be accessed only by disassembling the brake. Maintenance operations are therefore difficult, lengthy, and costly.

An object of the present invention is to propose a braking system that is simplified compared with the above-mentioned prior art systems, and that overcomes the above-indicated drawbacks.

This object is achieved by the facts that, for the purpose of being fed with cooling fluid, the cooling device is provided with a cooling duct branching from the brake release duct and communicating with the disk enclosure, that the cooling duct is formed in a casing portion of the braking system, and that it is provided with means for limiting the quantity of cooling fluid tapped by the cooling duct from the brake release duct.

The cooling duct branches from the brake release duct, so the casing of the braking system is provided with a single orifice for feeding both the cooling circuit and the brake release chamber (an orifice further being provided for feeding the braking fluid with fluid). However, the cooling duct is connected to the brake release circuit upstream from the brake release chamber.

Cooling fluid flow depends on brake release fluid feed. In other words, cooling ceases when brake release is no longer effective, which is functional since the source of heating also ceases when the rotor stops rotating. In contrast, during the deceleration phase, the brake release chamber continues to be fed, so that the brake disks continue to be irrigated with cooling fluid.

In addition, the continuous flow of fluid in the brake release circuit makes it possible to maintain the temperature of the fluid at a value such that its viscosity is sufficiently low, e.g. lower than 40 cSt, to ensure that the interruption in brake release by emptying the brake release chamber takes place with a short response time, of about 0.2 seconds, even if the ambient temperature is low, e.g. lower than 0° C.

Compared with the braking system of EP-A-0 913 304, the braking system of the invention makes it possible to provide maintenance that is greatly simplified since, in order to access the cooling duct, it is not necessary to disassemble the brake, nor even the brake release duct assembly. The cooling duct is formed in a casing portion and it is not necessary to disassemble parts internal to the braking system in order to have access to it.

Advantageously, the cooling duct is connected to the brake release duct via a connection segment which is formed in a casing portion and which has an end that is situated at the outer periphery of said casing portion and that is closed by removable closure means.

In which case, to access the cooling duct, it is necessary merely to remove the closure means.

In addition, the quantity of cooling fluid tapped from the brake release duct is limited by the means provided for this purpose, so that tapping cooling fluid does not adversely affect brake release.

Advantageously, the cooling duct is connected to the brake release duct via a device for limiting the flow rate of the fluid through said cooling duct.

This device for limiting the flow rate constitutes simple means for limiting the quantity of cooling fluid tapped from the brake release duct.

The flow-limiting device is preferably situated in said connection segment. Thus, maintenance operations (cleaning, replacement, repair) on the flow-limiting device can be performed after merely removing the above-mentioned closure means. The flow-limiting device can even be implemented in the form of interchangeable cartridges disposed in the connection segment (which is preferably rectilinear). Various cartridges may be used to satisfy various conditions of use for the brake.

Advantageously, the flow-limiting device is provided, at least in part, in the closure means which are disposed so as to be interposed between the brake release duct and the outlet of the cooling duct in the braking system.

Thus, on the basis of "standard" manufacture, it is possible merely to change the closure means in order to adapt the flow-limiting device to suit the conditions under which the brake is to be used.

The flow-limiting device is advantageously constituted by a restriction via which the cooling duct is connected to the brake release duct.

Advantageously, the cooling duct is connected to the brake release duct via a calibrated valve that allows the fluid to flow from the brake release duct to said cooling duct only when the fluid pressure in the brake release chamber is at least equal to a determined pressure.

The calibrated valve makes it possible to prevent the tapping of the cooling fluid from causing the pressure to drop in the circuit for feeding the brake release chamber with fluid. In addition, it makes it possible optionally to effect brake release with a pressure lower than the calibration value of the valve, without causing any cooling fluid to flow.

The presence of the calibrated valve or, more generally, of a flow-limiting device comprising means for automatically preventing the cooling duct from being fed with fluid, makes it possible to avoid a major drawback of the prior art described in EP-A-0 913 304. That drawback lies in the fact that, since the fluid is tapped continuously from the brake release chamber via the tapping duct, a reduction in the pressure in said chamber (due, for example, to a minor malfunction of the fluid feed means) might cause unwanted braking. Tapping the fluid empties the brake release chamber and amplifies the pressure reduction. It should also be noted that the fact that such a calibrated valve or that such automatic means can be disposed in the cooling circuit which is itself situated in a casing portion facilitates maintenance of the valve or of said means.

This is advantageous in particular when it is necessary to effect emergency brake release so as to be able to tow the machine equipped with the braking system of the invention. In which case, the pressure that makes brake release possible is in general delivered by an emergency auxiliary fluid source, such as a pre-charged pneumatic oil accumulator, an emergency electrically-driven pump set, a hand pump, or some other source. The flow rate of fluid delivered by such a source is relatively low, and the presence of the calibrated valve makes it possible to avoid it being necessary to "use up" fluid unnecessarily for cooling which is of no utility when towing.

A hydraulic motor comprising a rotary cylinder block having radial pistons and disposed in a stationary casing having a reaction member for the pistons advantageously further comprises a braking system of the invention, the rotor and the stator of said system being constrained to rotate respectively with the cylinder block and with the casing of said motor.

The stationary-casing motor may, for example, drive one or more displacement members (wheels) of a vehicle. The casing is fixed to the frame of the vehicle, while the cylinder block is coupled to the wheel via a shaft.

The multi-effect braking system makes it possible, during dynamic braking, to cause the vehicle to undergo gradual deceleration.

In such a motor, the disk enclosure is advantageously connected to the space inside the motor that is provided between the casing and the cylinder block via non-return valve means allowing the fluid to flow only in the direction going from the disk enclosure towards said inside space.

The inside space of the motor is normally filled with a fluid at a limited pressure, in particular under the effect of leaks that occur in the cylinder block. The cooling fluid is caused to flow simply by ensuring that the fluid flows into the inside space of the motor after it has passed through the disk enclosure. Generally, the inside space of the motor is connected to a pressure-free tank via a leakage return duct. In this way, the leakage return duct of the motor is used to remove the cooling fluid. This layout is advantageous because it makes it possible to omit a connection to a fluid return in the braking system and also the corresponding duct in the casing of the braking system, which connection and duct would otherwise be necessary to remove the cooling fluid.

When the motor includes a drive motor that is constrained to rotate with the cylinder block and a leakage return duct that connects an internal enclosure of the motor to an external discharge enclosure, the disk enclosure advantageously communicates with said internal enclosure via a connection duct provided in the drive shaft. This internal enclosure is distinct from the inside space of the motor that is provided between the cylinder block and that portion of the casing of the motor which has the reaction cam.

In which case, the connection duct provided in the drive shaft is of extremely simple shape. A motor is thus obtained that is compact and that is provided with a multi-effect brake, in which the cooling circuit makes use of the existing leakage return duct of the motor and is connected to it by a configuration that is simple and low-cost by means of the connection duct bored through the drive motor.

In an advantageous variant, the motor includes at least one group of pistons that are suitable for being "declutched" by being retracted into their respective cylinders towards the axis of rotation of the motor, said pistons being suitable for being maintained in this declutched position by the fluid pressure prevailing in the inside space of the motor that is provided between the reaction member and the cylinder block, said inside space being connected to the leakage return duct via calibrated valve means. The disk enclosure is then advantageously connected to the inside space of the motor so that the pressure serving to maintain the pistons in the declutched position is provided by the fluid coming from the disk enclosure.

By means of this configuration, the cooling fluid is used to contribute to maintaining the pistons in the declutched position, without requiring the presence of a duct fed specifically for this purpose. For example, the calibrated valve means may comprise a valve set to about 2 bars.

The invention will be well understood, and its advantages will appear more clearly on reading the following detailed description of an embodiment shown by way of non-limiting example. The description refers to the accompanying drawings, in which.

Figure 1:
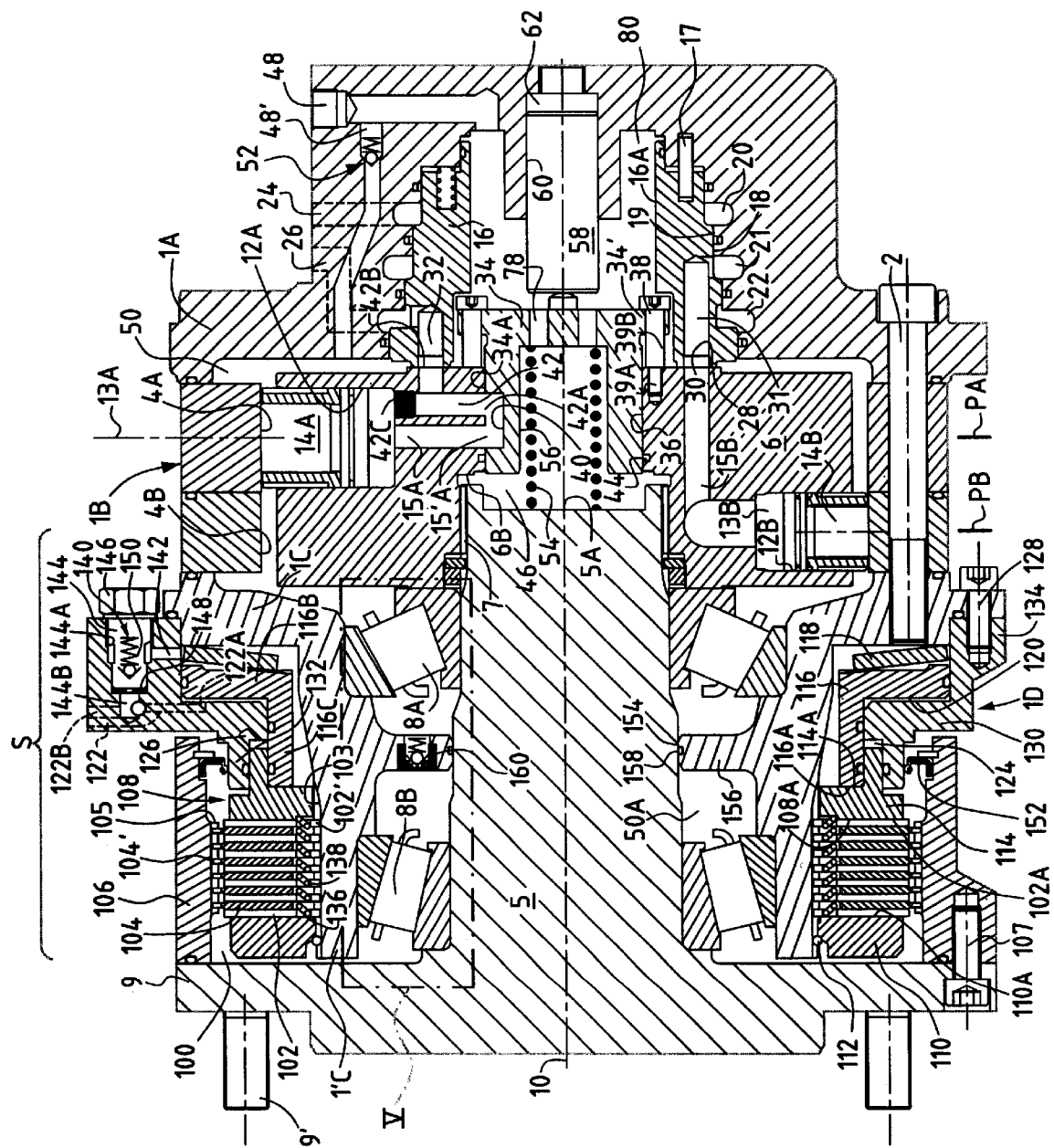
FIG. 1 is an axial section view of a hydraulic motor having radial pistons and equipped with a braking system of the invention.
Figure 2:
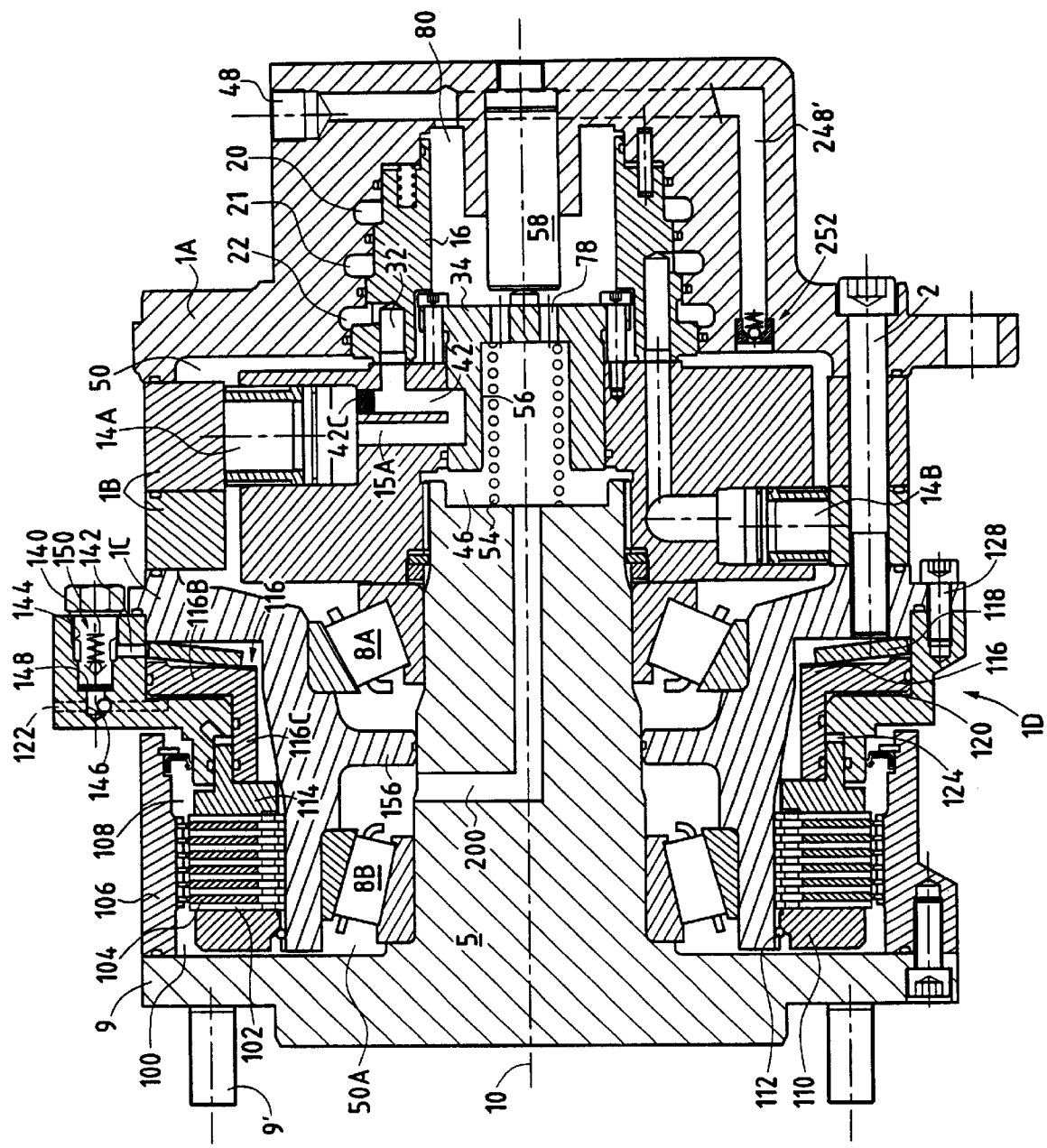
FIG. 2 shows a variant of the motor shown in FIG. 1.
Figure 3:
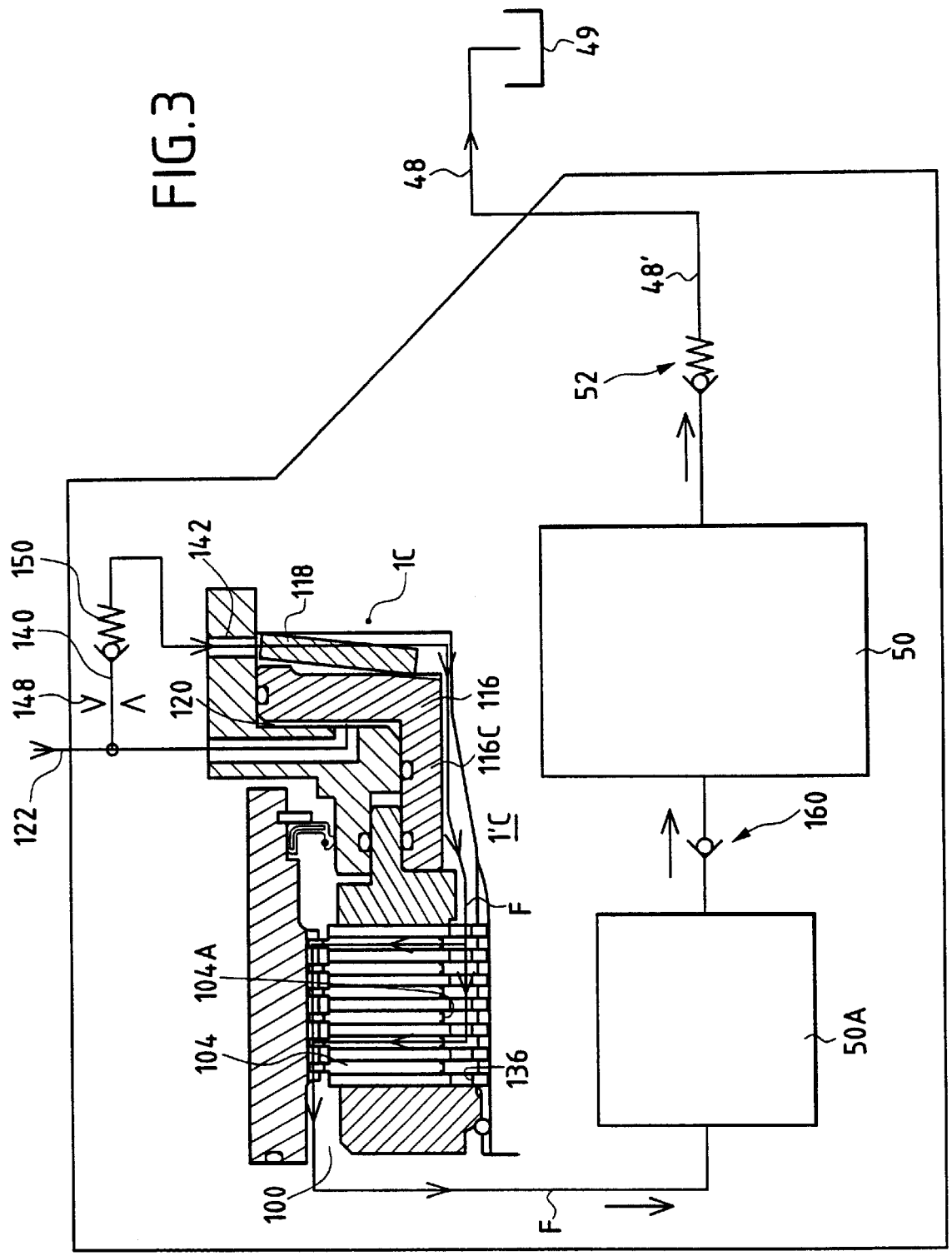
Figure 4:
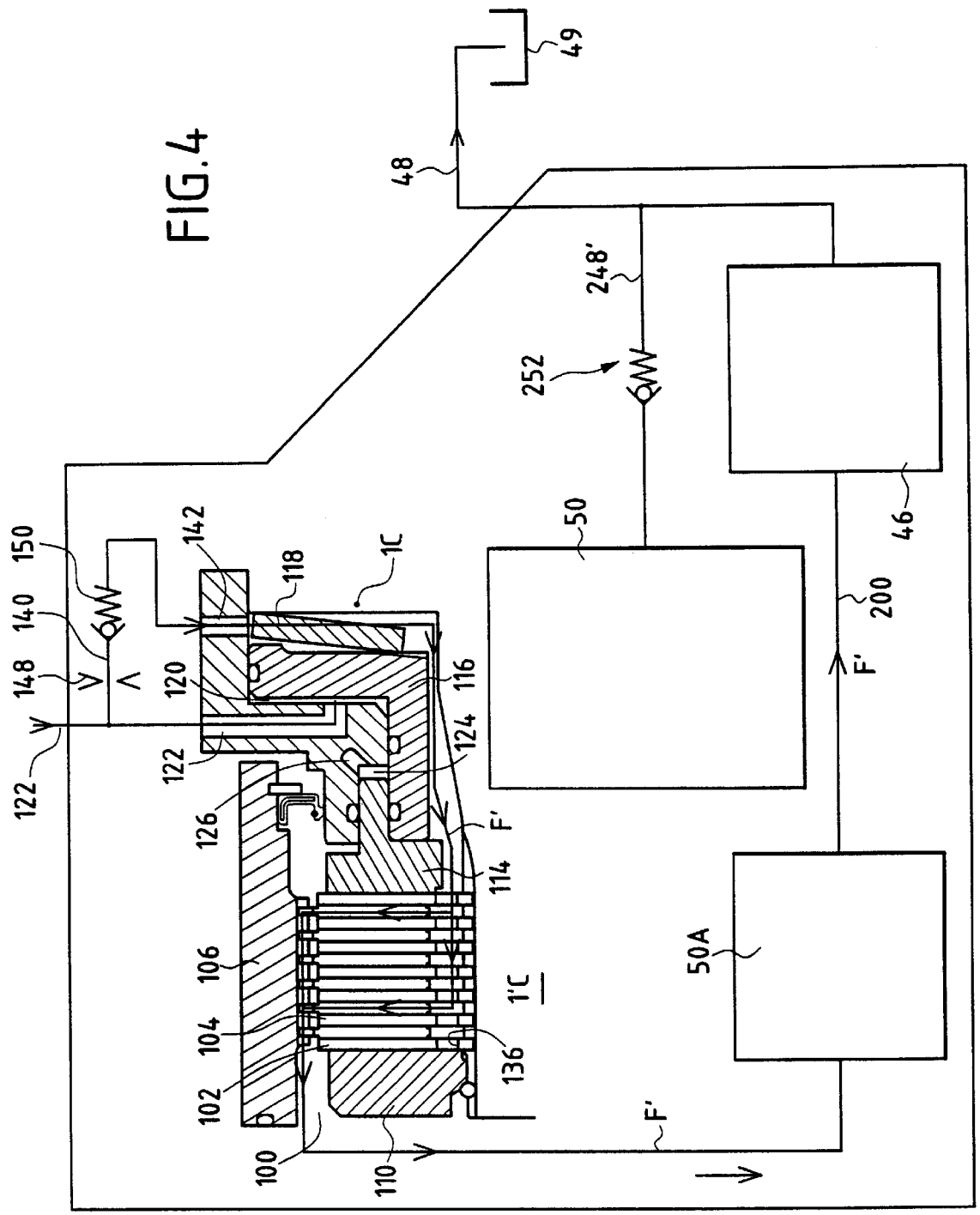
Figure 5A:
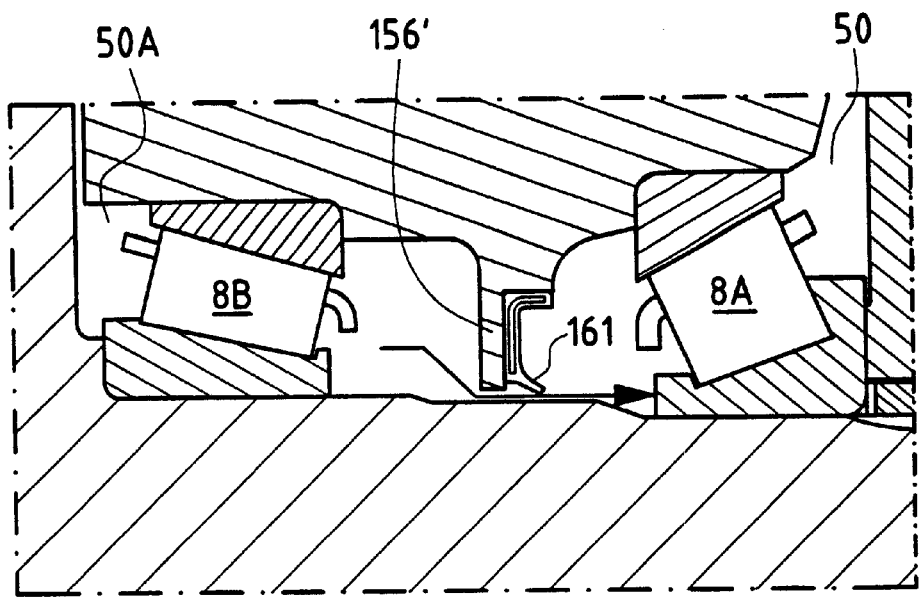
Figure 5B:
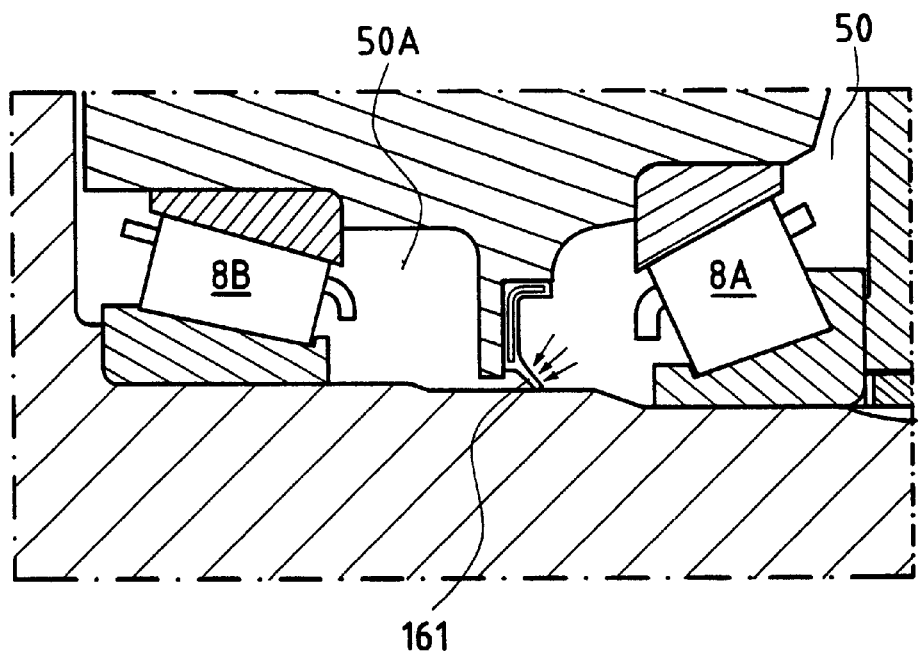

FIGS. 3 and 4 diagrammatically show two variants of the cooling fluid circuit, corresponding respectively to FIGS. 1 and 2; and FIGS. 5A and 5B show a variant embodiment of the region V of the motor of FIG. 1 or of the corresponding region of the motor of FIG. 2.

FIG. 1 shows a hydraulic motor having radial pistons, and having a stationary casing made up of a plurality of portions, namely a first portion 1A referred to as a "distribution cover", a second portion 1B whose inner periphery is undulating so as to form a reaction cam, and a third portion 1C. The various portions are assembled together by means of screws 2.

In the example shown, the undulating cam is itself made in two portions 4A and 4B juxtaposed axially. The motor includes a cylinder block 6 which is mounted to rotate about an axis of rotation 10 relative to the cam, and which is provided with a plurality of radial cylinders inside which radial pistons are slidably mounted.

There are two groups of cylinders, namely a first group of cylinders 12A, and a second group of cylinders 12B. The axes 13A of the cylinders 12A (which axes are disposed radially relative to the axis of rotation 10) define a first radial plane PA, while the axes 13B of the cylinders of the second group 12B define a second radial plane PB that is distinct from the plane PA. The pistons 14A which are mounted to slide in the cylinders 12A of the first group co-operate with the first portion 4A of the cam while the pistons 14B which are mounted to slide in the cylinders 12B of the second group co-operate with the second portion 4B of the cam.

The cylinder block 6 rotates a shaft 5 which co-operates therewith via fluting 7. That end of the shaft 5 which is opposite from the distribution cover 1A carries an outlet plate 9 which, via pins 9', can be coupled to a wheel. The shaft 5 is supported relative to the portion 1C of the casing by bearing means, e.g. conical roller bearings 8A and 8B.

The motor further includes an internal fluid distributor 16 which, via a system of studs and notches 17, is prevented from rotating relative to the distribution cover 1A.

The distributor 16 has a stepped outside face 18 which co-operates with a stepped inside axial face 19 of the distribution cover 1A. Three grooves, respectively designated by the references 20, 21, and 22, are provided between the faces 18 and 19.

The motor is further provided with two main ducts, namely a main inlet duct, and a main outlet duct. The main ducts do not lie in the section plane of FIG. 1 but, in order to facilitate understanding, their positions are indicated by dashed lines. Thus, the first main duct 24 is connected continuously to the first groove 20, while the second main duct 26 is connected continuously to the third groove 22. The second groove 21 can, depending on the position of a cubic capacity selector (not shown in FIG. 1), be connected to either one of the grooves 20 and 22.

The invention is applicable to other types of motor, e.g. to a motor having non-declutchable radial pistons, or to a motor having the group 12A as the only group of cylinders, or else to a motor in which only two distribution grooves, continuously connected to respective ones of the two main ducts, are provided between the distributor and the distribution cover.

Distribution ducts are provided in the distributor, and they open out in a radial distribution face 28 thereof, in abutment against a radial communication face 30 of the cylinder block. The distribution ducts selectively connect the grooves 20, 21, and 22 to the distribution face. In the example shown, the only distribution ducts shown are a distribution duct 31 which connects the groove 21 to the distribution face 28, and a distribution duct 32 which connects the groove 22 to the distribution face. Each cylinder is associated with a cylinder duct which makes it possible to connect the cylinder to the communication face 30 of the cylinder block, so as to put it in communication alternately with each of the distribution ducts while the cylinder block is rotating relative to the cam.

Thus, for each cylinder 12B of the second group of cylinders, a cylinder duct 15B puts the cylinder in communication directly with the communication face 30. In contrast, for the cylinders 12A of the first group, the cylinder ducts 15A are put in communication with the communication face 30 via a declutching selector 34.

The selector 34 is formed by a slide mounted to move axially in a central bore 36 in the cylinder block. The selector is constrained to rotate with the cylinder block about the axis 10. It has a flange portion 34' provided with holes through which the rods of screws 38 pass. Each of the rods has a threaded end portion 39A screwed into a tapped hole in the cylinder block, and a smooth intermediate portion 39B which co-operates with the hole in the flange 34', in which hole the rod in question is engaged. Thus, the selector 34 can slide relative to the screws 38.

The outside cylindrical face 34A of the selector 34 co-operating with the bore 36 in the cylinder block has as many communication ducts in the form of channels 40 as the first group of cylinders has cylinders, each channel 40 being associated with a respective cylinder duct 15A.

Each cylinder duct 15A has an end connected to the cylinder 12A and another end forming an orifice 15'A which opens into the bore 36 of the cylinder block. This orifice 15'A is continuously in communication with the communication channel 40 associated with the cylinder duct 15A in question.

Each cylinder duct 15A is associated with a distribution passageway formed by a duct 42 which has a first orifice 42A opening out in the bore 36 of the cylinder block, and a second orifice 42B opening out onto the communication face 30 of the cylinder block. As can be seen in FIG. 1, this makes it possible to connect the distribution passageway 42 to the distribution ducts such as the duct 32.

The cylinder duct 15A and the distribution passageway 42 thus both open out in the bore 36 and, as shown in FIG. 1, this enables the cylinder duct 15A to be caused to communicate with the distribution ducts when the selector 34 is in its first position. In axial section, and when the selector 34 is in the first position, the set formed by the duct 15A, the communication channel 40, and the distribution passageway 42 forms a substantially U-shaped duct connected to the communication face 30 of the cylinder block. The communication channel 40 extends substantially axially, and its length is sufficient to interconnect the orifices 15'A and 42A when the selector is in the first position. That end of the distribution passageway 42 which is situated closer to the cylinder 12A is closed by a stopper 42C.

An annular intercommunication groove 44 is provided in the bore 36 of the cylinder block 6. As a function of the displacement of the selector, this groove 44 can be put in communication with the communication channels 40. As considered in the direction in which the selector is displaced from its first position to its second position, the orifice 42A, the orifice 15'A, and the groove 44 are disposed one after the other.

When the selector is in the second position, it is displaced leftwards in FIG. 1 so that the orifices 15'A of the cylinder ducts of the first group continue to communicate with the communication channels 40 which themselves communicate with the groove 44 and which, above all, extend beyond the face 6B of the cylinder block so as to communicate with a decompression chamber 46 which is itself connected to a leakage return duct 48. This duct 48 is provided in the portion 1A of the casing and, in a manner known per se, it is connected to a pressure-free tank. When the selector is in the second position, the ducts 15A are isolated from the communication ducts 42. As a result, the pistons 14A of the cylinders of the first group can be declutched.

When the selector is in a transitional intermediate position between its first and second positions, the groove 44 makes it possible to cause the cylinder ducts 15A to communicate with one another in an isolated enclosure that it defines.

The selector 34 is continuously urged back into its first position by a spring 54 disposed in a recess 56 in the selector and bearing against the shaft 5. It is caused to go into its second position by a control piston 58 that co-operates with a control cylinder 60 which is provided in the distribution cover 1A. This control piston is displaced by feeding fluid into a control chamber 62.

The decompression chamber 46 is connected to the internal enclosure 80 of the motor, which enclosure is provided between the piston 58 and an internal bore 16A of the distributor via holes 78 provided in the flange 34' of the selector 34. The leakage return duct 48 is connected to said enclosure 80. It is also connected, via a segment 48', to the space inside the motor 50 that is provided between the cylinder block and the cam. This segment 48' is equipped with a calibrated non-return valve 52 which enables fluid to flow only in the direction going from the space 50 to the duct 48, and only when the fluid pressure in the space 50 is at least equal to a predetermined pressure.

The stator of the motor comprises the casing 1A, 1B, 1C, while the rotor comprises the shaft 5 and the cylinder block 6.

A description follows of the braking system S for braking the rotor relative to the stator. It includes annular brake disks disposed in a disk enclosure 100. The disks are distributed in a first series of disks 102 which are prevented from rotating relative to the stator, and in a second series of disks 104 which are constrained to rotate with the rotor relative to the stator. At their outer peripheries, the disks 104 are provided with teeth 104' which co-operate with fluting 105 provided in the inner periphery of a portion of the rotor. In the advantageous example shown, this portion is constituted by an axial wall element 106 which is fixed to the plate 9 by screws 107 and which extends from the plate towards the distribution cover 1A so as to extend around part of the portion 1C of the casing of the motor and around part of the shaft 5. The portion 1C has an axial segment substantially in the form of a sleeve 1'C which is disposed on an intermediate radius between radius of the shaft 5 and the radius of the axial wall element 106.

The annular disks 102 of the first series are secured to the portion 1C of the casing and, for this purpose, their inner peripheries are provided with teeth 102' which co-operate with fluting 103 provided in the outer periphery of the sleeve 1'C.

Braking is caused by means of a brake piston device 108. The disks 102 and 104 are disposed between an axially stationary member 110 and the active face 108A of the brake piston device. In the example shown, the member 110 is constituted by an annular flange which is mounted on the sleeve 1'C and which is held relative thereto by means of a locking ring 112. When the piston device 108 is displaced towards the stationary element 110, the disks of the two series, which disks are interleaved with one another, are urged into frictional contact with one another. In this example, the rotary disks are the outer disks which are secured to the axial wall element 106, while the stationary disks are the inner disks which are secured to the sleeve 1'C. The outside diameter of the outer disks is greater then the outside diameter of the inner disks.

The brake is a multi-effect brake, and, for this purpose, the piston device 108 is made up of two elementary pistons mounted to slide relative to each other. The first elementary piston 114 is that one which has the active face 108A, and it co-operates with the first brake disk (in this example, a disk 102A of the first series), which first disk is the disk closest to said active face.

The second elementary piston 116 co-operates with the braking resilient return means which, in the example shown, are constituted by a Belleville spring washer 118. this spring 118 tends to urge the elementary piston 116 resiliently towards the brake disks. The elementary piston is provided with an abutment face 116A which then comes into abutment against a complementary abutment face 114A of the first elementary piston, the face 114A being opposite from the face 108A. Thus, under the effect of the spring 118, the elementary piston 116 tends to push the elementary piston 114 back towards the brake disks, so that the entire piston device 108 takes up its braking configuration.

This braking system also includes a hydraulic brake release chamber 120 which can be fed with fluid under pressure via a brake release duct 122 so that, with a force opposing the force of the spring 118, it moves the elementary piston 116 away from the brake disks. The braking system further includes a hydraulic braking chamber 124 which can be fed with fluid under pressure via a braking duct 126 so as to urge the first elementary piston 114 into its braking position. The elementary piston 116 has a portion in the form of an annular disk 116B and a sleeve portion 116C which extends from the portion in the form of an annular disk towards the brake disks. It is this sleeve 116C that carries the abutment face 116A.

The chambers 120 and 124 are separated by a piece 1D which, by means of screws 128, is secured to the portion 1C of the casing. This piece 1D is referred to as the "brake support". The chambers 120 and 124 are separated by a portion 130 of the piece 1D in the form of a radial flange. The piece 1D is also provided with a first axial extension in the form of a sleeve 132 which extends from the portion 130 towards the disk enclosure 100. It has a second axial extension 134 situated on the side opposite from the extension 132 and co-operating with the screws 128.

It can be understood that, by feeding the brake release chamber 120 with fluid, it is possible to release the braking if the chamber 124 is not fed with fluid. It is also possible to provide brake release resilient return means tending to push the elementary piston 114 back continuously in the direction in which its active face 108A moves away from the stationary element 110. In particular, the inner disks 102 may, in the vicinities of their inner peripheries, may be provided with perforations or notches 136 in which helical compression springs 138 are disposed. The helical compression springs 138 bear against the face 108A of the elementary piston 114 and against that face 110A of the piece 110 which faces towards said face 108A.

The perforations 136 also make it easier for the cooling fluid to flow, as explained below.

The braking duct 126 does not lie entirely in the section plane, and only the beginning of this duct is shown, in the vicinity of the braking chamber 124.

Similarly, the brake release duct 122 does not lie in the section plane, and it is shown essentially in dashed lines. It extends between a first end 122A which opens into the brake release chamber 120, and a second end 122B which is open to the outside of the casing so as to be connected to a pressurized fluid source. Both the brake release duct and the braking duct 126 are formed in the piece 1D.

The rotor of the braking system proper comprises a portion of the shaft 5, the plate 9, and the axial wall element 106, while the stator comprises that portion 1C of the casing to which the brake support 1D is fixed.

The braking system of the invention includes a device for cooling the brake disks 102 and 104 by means of fluid flow. A cooling duct 140 is connected continuously to the disk enclosure 100. This duct 140 is disposed in the piece 1D, and it opens into the space inside the braking system, in the region containing the spring 118, the end of the cooling duct being situated between the piece 1C and the second elementary piston 116. The cooling duct 140 branches from the brake release duct 122. The duct 140 has a radial segment 142 which is connected to an axial segment 144 formed by a hole provided in a region of the portion 134 of the piece 1D that projects radially, the hole being closed to the outside of the piece 1D by means of a stopper 146. This segment 144 makes it possible to connect the cooling duct 140 to the brake release duct 122.

The hole 144 comprises a tapped first portion 144A with which the stopper 146 co-operates, and a second portion 144B of diameter smaller than the diameter of the first portion 144A, this portion 144B having an intersection with the brake release duct 122. Thus, a shoulder is formed between the portions 144A and 144B. This shoulder is used to dispose a restriction 148 constituted, for example, by a washer-shaped piece having a calibrated orifice and set against the above-mentioned shoulder. As a result, the quantity of cooling fluid that is tapped from the brake release duct 122 when said duct is fed with pressurized fluid is limited.

A calibrated valve 150 is disposed in the cooling duct 140. Thus, this duct is connected to the duct 122 via the calibrated valve which allows the fluid to flow between the brake release duct and the cooling duct only in the direction going from the brake release duct 122 to the cooling duct 140 and only when the pressure of the fluid in the brake release duct 122 and thus in the brake release chamber 120 is at least equal to a determined pressure dependent on the calibration of the valve.

For example, when the motor is fed by a main pump of a hydrostatic closed circuit, the circuit also includes a booster pump. In which case, the brake release chamber is fed via said booster pump, the boost pressure being about 20 bars, for example, while the pressure delivered by the main pump can reach in the range 300 bars to 400 bars. Brake release is obtained as soon as the pressure of the fluid in the brake release chamber reaches a brake release pressure, e.g. 10 bars. The valve 150 may be set to an intermediate pressure between the brake release pressure and the boost pressure, e.g. approximately in the range 12 bars to 14 bars. Thus, since brake release is effected by the boost pressure, cooling takes place during the brake release under normal operating conditions. If, for example, as a result of a failure of the hydraulic circuit, it is necessary to tow the vehicle and thus to perform brake release, the brake release duct 122 may be fed via an emergency system, such as a handpump. The pressure delivered by such a handpump is lower than the calibration pressure of the valve 150, so that the brake release fluid is not consumed unnecessarily for cooling.

It can be observed that the calibrated valve 150 is disposed after the restriction 148 in the direction going from the brake release duct 122 to the cooling duct. As a result, the flow rate of fluid through the valve is limited and said valve can be dimensioned accordingly.

In FIG. 1, the disk enclosure 100 is closed to the outside of the braking system by a gasket 152 which forms a leaktight junction between the axial wall element 106 and the piece 1D. The disk enclosure is in continuous communication with that portion of the space inside the motor which contains the roller bearing 8B supporting the shaft as it rotates relative to the casing. The roller bearing 8B is disposed between the inner periphery of the sleeve portion 1'C of the piece 1C and the shaft 5.

That portion of the space inside the motor which contains the roller bearing 8B is referred to as the "roller bearing enclosure" and is designated by reference 50A. It is separated from that portion 50 of the space inside the motor which lies between the cylinder block and the cam by co-operation between the portion 1C of the casing and the shaft 5. To this end, in the example shown, the portion 1C of the casing has an axial face 154 which, in this example, is formed at the inner end of an annular wall element 156 of the portion 10 of the casing that extends towards the shaft 5. A sealing gasket 158 provides leaktight coupling between the face 154 and the axial face of the shaft.

The roller bearing enclosure communicates with the space 50 via a non-return valve 160 allowing the fluid to flow only in the direction going from the disk enclosure 100 and from the enclosure 50A towards the space 50. In the example shown, this valve 50A is disposed in the annular wall element 156. Since this space is connected to the leakage return duct 48 via the duct segment 48' equipped with the above-mentioned valve 52, the cooling fluid can return to a pressure-free tank. In the above-mentioned example, the calibration pressure of the valve is about 2 bars.

In the example shown, the annular wall element 156 which makes it possible to separate the enclosure 50A from the space 50 is disposed between the roller bearings 8A and 8B supporting the shaft 5 as it rotates relative to the casing.

The flow of the cooling fluid is shown diagrammatically in FIG. 3 which shows only a portion of the disk enclosure 100. It shows the brake release duct 122 which is connected to the brake release chamber 120. The cooling duct 140 branches off from this duct. The restriction 148 and the calibrated valve 150 disposed on said duct are shown. Thus, the cooling fluid flows through the segment of cooling duct 142 into the space provided between the second elementary piston 116 and the portion 1C of the casing, in the region in which the spring 118 is situated. The fluid then flows between the facing axial faces of the sleeve portion 116C of the elementary piston 116 and of the sleeve portion 1'C of the portion 1C of the casing, until it reaches the region containing the brake disks.

The cooling duct 142 communicates with the disk enclosure 100 in a region of said enclosure that is adjacent to the axis of rotation 10 about which the rotor rotates relative to the stator. The cooling fluid arrives in the enclosure 100, as indicated above, in the region of the inner peripheries of the brake disks. Only the inner disks 102 secured to the stator lie on the inlet diameter at which the cooling fluid flows into the disk enclosure 100. The inner free ends 104A of the disks 104 reach a diameter greater than the maximum diameter of the perforations 136 that are provided in the inner disks only. Although the brake release springs 138 are advantageously present in the perforations 136, they are not necessarily present. Whether or not said springs are present, the perforations constitute paths over which the cooling fluid can flow. As indicated by the arrows F, this fluid passes through the perforations and can spread between the disks to flood them completely.

When the brake release springs are not present, the perforations 136 are advantageously offset angularly relative to one another (from one disk to another) on assembling together the disks. This further facilitates spreading the cooling fluid through all of the disks because the offset perforations constitute axial baffles.

FIG. 3 shows that the cooling fluid that reaches the disk enclosure 100 in a region of the enclosure that is adjacent to the axis of rotation about which the rotor rotates relative to the stator tends to flow radially outwards. The heat is thus transported towards the axial wall element 106 which defines the disk enclosure 100 at its outer periphery. This axial wall element is in contact with the external ambient air so that the above-mentioned flow of cooling fluid makes it possible to provide effective cooling. This cooling is further improved by the fact that the axial wall element 106 is a rotary element.

In the advantageous variant shown, the inner disks 102 (those whose inner peripheries are closer to the axis) are prevented from rotating since they are secured to the stator. The cooling fluid thus enters the disk enclosure 100 in a "calm" region of said enclosure, and then comes into contact with the rotary disks so as to be spread towards the outside of the disk enclosure 100.

In FIG. 3, the arrow F indicates the flow of the cooling fluid which flows from the disk enclosure 100 and enters the roller bearing enclosure 50A which is continuously in communication with the enclosure 100. The space 50 inside the motor that is provided between the cylinder block and the cam communicates with said enclosure 50A only via the non-return valve 160 which allows the fluid to flow only in the direction going from the roller bearing enclosure 50A to the inside space 50. Thus, the disk enclosure 100 communicates with the space 50 only via the non-return valve 160 which is disposed in a "connection duct" between the enclosure 100 and the space 50. Then, via the non-return calibrated valve 52 whose calibration pressure is, for example, about 2 bars, the cooling fluid can flow out through the segment 48' of leakage return duct, and then through the leakage return duct 48 so as to flow into an external discharge enclosure 49, e.g. a pressure-free tank.

It is indicated above that the pistons 14A of the first group of pistons of the motor shown in FIG. 1 can be declutched by being retracted into their respective cylinders towards the axis of rotation 10 of the motor. The presence of the above-mentioned valves 160 and 52 makes it possible to establish a pressure in the inside space 50 that is equal to the calibration pressure of the valve 52, e.g. about 2 bars. Thus, this pressure, which serves to maintain the pistons 14A in their declutched position, is provided by the cooling fluid coming from the disk enclosure 100.

It is indicated above that the non-return valve 160 allows the fluid to flow only in the direction going from the enclosure 100 towards the inside space 50. As can be seen in FIGS. 5A and 5B, these "non-return valve means" may also be formed by a dynamic seal. Thus, in the example shown in FIGS. 5A and 5B, a lip seal 161 may be interposed between the roller bearing enclosure 50A and the inside space 50 of the motor. For example, the lip seal may be disposed in an annular flange portion 156' of the portion 1C of the casing, which annular flange is shaped accordingly. The lip seal is disposed so as to enable the fluid to flow in the direction going from the enclosure 50A towards the inside space 50, when the fluid pressure in the enclosure 50A is greater than the pressure in the space 50 (FIG. 5A). Otherwise, as shown in FIG. 5B, the lip seal 161 prevents the fluid from flowing in the direction going from the space 50 towards the enclosure 50A.

In general, a dynamic seal may be interposed between the disk enclosure 100 and the space 50 so as to allow the fluid to flow only in the direction going from the enclosure 100 towards the space 50.

When the pistons 14A as declutched are "re-clutched" under the effect of the selector 34 being displaced, this can cause a momentary pressure surge in the inside space 50. By preventing the flow of fluid in the direction going from said space 50 towards the enclosure 100, it is possible to avoid pressure peaks from appearing in the disk chamber 100.

FIGS. 2 and 4 show a variant affecting the flow of the cooling fluid. In FIG. 2, the disk enclosure 100 communicates with the decompression chamber 46 via a connection duct 200 which is provided in the shaft 5 of the motor. As indicated above, this decompression chamber is connected, via the holes 78 in the selector 34, to the internal enclosure 80 of the motor. When the pistons of the first group are in the declutched position, this enclosure communicates with the cylinder ducts 15A corresponding to these pistons.

The internal enclosure 80 is itself connected to the leakage return duct 48. Thus, in a motor having declutchable pistons, use is made of the communication already existing between the decompression chamber 46 and the leakage return duct so as also to cause the disk enclosure 100 to communicate with the leakage return duct.

This also applies to a non-declutchable motor and, in general, this variant concerns the case when the disk enclosure 100 communicates, via a connection duct 200 provided in the drive shaft, with an internal enclosure of the motor, which enclosure is itself connected to an external discharge enclosure.

As in the example in FIG. 1, the example in FIG. 2 shows that the disk enclosure 100 communicates continuously with the roller bearing enclosure 50A containing the roller bearings 8B.

The holes 78 that cause the compensation chamber 46 to communicate with the leakage return duct 48 (via the enclosure 80) may be equipped with restriction-forming means. In particular, the presence of the turns of the spring 54 across the holes may act as such restrictions. In this way, head loss is obtained on either side of the holes 78.

As in FIG. 1, the motor of FIG. 2 has pistons 14A of the first group that are declutchable. Once again, to hold them in the declutched position, use is made of the fluid pressure prevailing in the space inside the motor 50 that is defined by cylinder block 6 and the casing 1A, 1B, 1C. In FIG. 2, unlike FIG. 1, the disk enclosure 100 does not communicate with the space 50 but rather it communicates, via the chamber 46, with the leakage return duct. The space 50 communicates via a calibrated non-return valve 252 with a duct 248' which branches from the leakage return duct 48. For example, the calibration pressure of the valve 252 may be about 2 bars. This valve allows fluid to flow between the space 50 and the duct 248' only in the direction going from the space 50 towards said duct. Under the effect of the leakage between the cylinder block and the pistons, the fluid flows into the inside space 50. By means of the presence of the calibrated non-return valve 252, the fluid pressure is guaranteed to be at least equal to the calibration pressure of the valve, so as to contribute to maintaining the pistons 14A in the declutched position when the selector 34 is in the declutching position.

The cooling fluid circuit diagram of the motor of FIG. 2 is shown in FIG. 4. It is possible to see the brake release duct 122 connected to the brake release chamber 120, as well as the braking duct 126 connected to the braking chamber 124. The cooling duct 140 branches from the brake release duct 122. As in FIGS. 1 and 3, the cooling fluid reaches the disk enclosure 100 and is spread towards the outside of said enclosure. The cooling fluid flow is indicated by the arrows F'. At the outlet of the disk enclosure 100, the cooling fluid penetrates into the decompression chamber 46 via the connection duct 200 (e.g. after having passed through the roller bearing enclosure 50A). This flowing between the disk enclosure 100 and the chamber 46 takes place without any particular restriction. At the outlet of the chamber 46, the cooling fluid is connected to an external discharge enclosure 49, via the leakage return duct 48. The space inside the motor 50 is connected to the leakage return duct 48 via an intermediate duct 248' on which the calibrated non-return valve 252 is disposed.

The dynamic seal or lip seal 161 of FIGS. 5A and 5B may also be provided in the variant shown in FIG. 2.

What is claimed is:

1. A braking system for braking a rotor relative to a stator, said system comprising brake disks disposed in a disk enclosure, which disks are distributed in a first series of disks secured to the stator and in a second series of disks constrained to rotate with the rotor relative to the stator, the system further comprising a brake piston device that can be caused to go between a braking configuration in which an active portion of said piston device co-operates with the brake disks so as to urge said disks into braking contact, and a brake release configuration, the system further comprising control means for controlling the piston device, which control means comprise braking resilient return means continuously urging the brake piston device towards its braking configuration, a brake release chamber distinct from the disk enclosure and suitable for being fed with pressurized fluid via a brake release duct so as to urge the brake piston device into its brake release configuration, and a braking chamber suitable for being fed with pressurized fluid so as to urge the brake piston device towards its braking configuration, the braking system further comprising a cooling device for cooling the brake disks by means of fluid flow, wherein, for the purpose of being fed with cooling fluid, the cooling device is provided with a cooling duct branching from the brake release duct and communicating with the disk enclosure, said cooling duct being formed in a casing portion of the braking system, and wherein the system is provided with means for limiting the quantity of cooling fluid tapped by the cooling duct from the brake release duct.

2. A system as claimed in claim 1, wherein the cooling duct is connected to the brake release duct via a connection segment which is formed in a casing portion and which has an end that is situated at the outer periphery of said casing portion and that is closed by removable closure means.

3. A system as claimed in claim 1, wherein the cooling duct is connected to the brake release duct via a device for limiting a flow rate of the fluid through said cooling duct.

4. A system according to claim 3, wherein the cooling duct is connected to the brake release duct via a restriction.

5. A system as claimed in claim 4, wherein the cooling duct is connected to the brake release duct via a calibrated valve that allows the fluid to flow from the brake release duct to said cooling duct only when the fluid pressure in the brake release chamber is at least equal to a determined pressure and wherein the calibrated valve is disposed after the restriction in the direction going from the brake release duct to the cooling duct.

6. A system as claimed in claim 1, wherein the cooling duct is connected to the brake release duct via a calibrated valve that allows the fluid to flow from the brake release duct to said cooling duct only when the fluid pressure in the brake release chamber is at least equal to a determined pressure.

7. A system as claimed in claim 1, wherein the cooling duct communicates with the disk enclosure in a region of said enclosure that is adjacent to the axis of rotation about which the rotor rotates relative to the stator.

8. A system as claimed in claim 7, wherein perforations are provided in brake disk portions of the brake disks that lie in that region of the disk enclosure which is adjacent to the axis of rotation about which the rotor rotates relative to the stator, the perforations of the disks successively disposed in the axial direction being angularly offset relative to one another.

9. A system as claimed in claim 1, wherein the disks of the second series, which disks are secured to the rotor, are of outside diameter greater than an outside diameter of the disks of the first series, which disks are secured to the stator, the rotor extending at least in part about the stator, and each disk of the second series co-operating with the rotor via an outer periphery thereof, while each disk of the first series co-operates with the stator via an inner periphery thereof.

10. A system as claimed in claim 1, wherein the rotor is supported as it rotates relative to the stator by a bearing comprising at least one roller bearing disposed in a roller bearing enclosure in continuous communication with the disk enclosure.

11. A hydraulic motor comprising a rotary cylinder block having radial pistons and disposed in a stationary casing having a reaction member for the pistons, said hydraulic motor having a rotor and a stator which are constrained to rotate respectively with the cylinder block and with the casing of said motor, the latter having a braking system comprising brake disks disposed in a disk enclosure, which disks are distributed in a first series of disks secured to the stator and in a second series of disks constrained to rotate with the rotor relative to the stator, the system further comprising a brake piston device that can be caused to go between a braking configuration in which an active portion of said piston device co-operates with the brake disks so as to urge said disks into braking contact, and a brake release configuration, the system further comprising control means for controlling the piston device, which control means comprise braking resilient return means continuously urging the brake piston device towards its braking configuration, a brake release chamber distinct from the disk enclosure and suitable for being fed with pressurized fluid via a brake release duct so as to urge the brake piston device into its brake release configuration, and a braking chamber suitable for being fed with pressurized fluid so as to urge the brake piston device towards its braking configuration, the braking system further comprising a cooling device for cooling the brake disks by means of fluid flow, wherein, for the purpose of being fed with cooling fluid, the cooling device is provided with a cooling duct branching from the brake release duct and communicating with the disk enclosure, said cooling duct being formed in a casing portion of the braking system, and wherein the system is provided with means for limiting the quantity of cooling fluid tapped by the cooling duct from the brake release duct.

12. A motor as claimed in claim 11, wherein the cooling duct is connected to the brake release duct via a connection segment which is formed in a casing portion and which has an end that is situated at the outer periphery of said casing portion and that is closed by removable closure means.

13. A motor as claimed in claim 11, wherein the cooling duct is connected to the brake release duct via a device for limiting a flow rate of the fluid through said cooling duct.

14. A motor as claimed in claim 11, wherein the cooling duct is connected to the brake release duct via a calibrated valve that allows the fluid to flow from the brake release duct to said cooling duct only when the fluid pressure in the brake release chamber is at least equal to a determined pressure.

15. A motor as claimed in claim 11, wherein the disk enclosure is connected to a space inside the motor that is provided between the casing and the cylinder block via non-return valve means allowing the fluid to flow only in the direction going from the disk enclosure towards said inside space.

16. A motor according to claim 15, wherein the disk enclosure is separated from an inside space of the motor that is provided between the casing and the cylinder block by a dynamic seal disposed so as to allow the fluid to flow between said enclosure and said inside space only in the direction going from said enclosure towards said inside space.

17. A motor as claimed in claim 11, including at least one group of pistons that are suitable for being declutched by being retracted into their respective cylinders towards an axis of rotation of the motor, said pistons being suitable for being maintained in this declutched position by the fluid pressure prevailing in the inside space of the motor that is provided between the casing and the cylinder block, said inside space being connected to a leakage return duct via calibrated valve means, and the disk enclosure being connected to the inside space of the motor so that the pressure serving to maintain the pistons in the declutched position is provided by the fluid coming from the disk enclosure.

18. A motor as claimed in claim 17, including means for allowing the fluid to flow between the disk enclosure and the inside space of the motor only in a direction going from said enclosure towards said space.

19. A motor as claimed in claim 17, including a non-return valve disposed in the connection duct between the disk enclosure and the space inside the motor.

20. A motor as claimed in claim 11, including a drive shaft constrained to rotate with the cylinder block, and a leakage return duct which connects an internal enclosure of the motor to an external discharge enclosure, the disk enclosure communicating with said internal enclosure via a connection duct provided in the drive shaft.

* * * * *